US009853890B2

(12) United States Patent
Gafni et al.

(10) Patent No.: US 9,853,890 B2
(45) Date of Patent: Dec. 26, 2017

(54) EFFICIENT IMPLEMENTATION OF MPLS TABLES FOR MULTI-LEVEL AND MULTI-PATH SCENARIOS

(71) Applicant: Mellanox Technologies Ltd., Yokneam (IL)

(72) Inventors: Barak Gafni, Kfar Malal (IL); Aviv Kfir, Nili (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 164 days.

(21) Appl. No.: 14/665,005

(22) Filed: Mar. 23, 2015

(65) Prior Publication Data

US 2016/0285756 A1 Sep. 29, 2016

(51) Int. Cl.
*H04L 12/723* (2013.01)
*H04L 12/741* (2013.01)

(52) U.S. Cl.
CPC ............ *H04L 45/507* (2013.01); *H04L 45/50* (2013.01); *H04L 45/745* (2013.01)

(58) Field of Classification Search
CPC ...... H04L 45/507; H04L 45/745; H04L 45/50
See application file for complete search history.

(56) References Cited

U.S. PATENT DOCUMENTS

| | | | |
|---|---|---|---|
| 7,061,911 B2 | 6/2006 | Furuno | |
| 7,088,718 B1 | 8/2006 | Srivastava | |
| 7,260,079 B1 | 8/2007 | Chapman et al. | |
| 7,606,230 B1 | 10/2009 | Cohen et al. | |
| 8,014,317 B1* | 9/2011 | Ghosh | H04L 12/4633 370/254 |
| 2001/0021189 A1 | 9/2001 | Shiota et al. | |
| 2007/0133568 A1 | 6/2007 | Qing et al. | |
| 2007/0189265 A1 | 8/2007 | Li | |
| 2010/0302935 A1 | 12/2010 | Zhang et al. | |
| 2012/0069745 A1* | 3/2012 | Kini | H04L 45/22 370/252 |
| 2012/0163189 A1 | 6/2012 | Allan et al. | |

(Continued)

OTHER PUBLICATIONS

Rosen et al., "Multiprotocol Label Switching Architecture", Network Working Group, Request for Comments 3031, 61 pages, Jan. 2001.

(Continued)

*Primary Examiner* — Michael Thier
*Assistant Examiner* — Brian Cox
(74) *Attorney, Agent, or Firm* — D.Kligler IP Services Ltd.

(57) ABSTRACT

A method for communication includes configuring a router to forward data packets over a network in accordance with Multiprotocol Label Switching (MPLS) labels appended to the data packets. At least first and second entries, corresponding to respective first and second labels, are stored in a Next Hop Label Forwarding Entry (NHLFE) table in the router, such that each of the first entries contains a respective pointer to at least one of the second entries. Upon receiving in the router a data packet from the network, a first entry is selected from among the first entries in the NHLFE table and, responsively to the pointer in the first entry, a second entry is selected. The respective first and second labels from the selected first and second entries are pushed onto an MPLS label stack of the data packet.

17 Claims, 2 Drawing Sheets

(56) References Cited

U.S. PATENT DOCUMENTS

| | | | | |
|---|---|---|---|---|
| 2014/0177638 A1* | 6/2014 | Bragg | ................... | H04L 45/50 370/395.5 |
| 2014/0293786 A1* | 10/2014 | Lin | ................... | H04L 47/17 370/235 |
| 2015/0109907 A1* | 4/2015 | Akiya | ................... | H04L 47/125 370/229 |
| 2015/0146536 A1 | 5/2015 | Minei et al. | | |
| 2016/0112316 A1* | 4/2016 | Wang | ................... | H04L 45/745 370/392 |

OTHER PUBLICATIONS

Rosen et al., "MPLS Label Stack Encoding", Network Working Group, Request for Comments 3032, 23 pages, Jan. 2001.

Fang et al., "MPLS-Based Hierarchical SDN for Hyper-Scale DC/Cloud draft-fang-mpls-hsdn-for-hsdc-00", IETF Internet-Draft, 24 pages, Oct. 27, 2014.

Fang et al., "SDN and MPLS for DC", Microsoft, 16 pages, Nov. 3, 2014.

Afanasiev et al., "MPLS in DC and inter-DC networks: the unified forwarding mechanism for network programmability at scale", 40 pages, SDN/MPLS 2014 International Conference, Nov. 2-5, 2014.

Gafni et al., U.S. Appl. No. 14/634,842, filed Mar. 1, 2015.

Kompella et al., "The Use of Entropy Labels in MPLS Forwarding", Internet Engineering Task Force (IETF), RFC 6790, 25 pages, Nov. 2012.

Gafni et al., U.S. Appl. No. 14/705,003, filed May 6, 2015.

Le Faucheur et al., "Multi-Protocol Label Switching (MPLS) Support of Differentiated Services", Network Working Group, RFC 3270, 56 pages, May 2002.

Blake et al., "An Architecture for Differentiated Services", Network Working Group, RFC 2475, 36 pages, Dec. 1998.

IEEE 802.1Q, "IEEE Standard for Local and metropolitan area networks Virtual Bridged Local Area Networks", IEEE Computer Society, 303 pages, May 19, 2006.

IEEE 802.1Qbb, "IEEE Standard for Local and metropolitan area networks—Media Access Control (MAC) Bridges and Virtual Bridged Local Area Networks—Amendment 17: Priority-based Flow Control", IEEE Computer Society, 40 pages, Sep. 30, 2011.

U.S. Appl. No. 14/634,842 Office Action dated Jul. 28, 2017.

* cited by examiner

EFFICIENT IMPLEMENTATION OF MPLS TABLES FOR MULTI-LEVEL AND MULTI-PATH SCENARIOS

FIELD OF THE INVENTION

The present invention relates generally to computer networks, and specifically to routing and forwarding of data packets in such networks.

BACKGROUND

Multiprotocol Label Switching (MPLS) is a mechanism for packet routing that is widely used in high-performance computer networks. In an MPLS network, data packets are assigned labels, and packet-forwarding decisions are made solely on the contents of the labels, without the need to examine the network address of the packet itself. The MPLS architecture and label structure were originally defined by Rosen et al. in Requests for Comments (RFCs) 3031 and 3032 of the Internet Engineering Task Force (IETF) Network Working Group (2001), which are incorporated herein by reference.

MPLS is a network-layer protocol (Layer 3 in the Open Systems Interconnection [OSI] model), which is implemented by routers in place of or in addition to address-based routing. At the ingress to an MPLS network, a prefix is appended to the packet header, containing one or more MPLS labels. This prefix is called a label stack. According to RFC 3032, each label in the label stack contains four fields:
- A 20-bit label value (commonly referred to as the label identifier or "label ID").
- A 3-bit traffic class field for QoS (quality of service) priority and ECN (explicit congestion notification) signaling (also referred to as the "EXP" or traffic class—"TC"—field).
- A 1-bit bottom-of-stack flag, which is set to indicate that the current label is the last in the stack.
- An 8-bit TTL (time to live) field.

As explained in RFC 3031, any given router may use multiple different "label spaces," with different label spaces being associated with different interfaces of the router, for example, so that label IDs are unique only within their given label space. Therefore, the term "label ID," as used in the context of the present description and in the claims, should be understood to refer, where appropriate, to the couple (label space, label ID).

A router that routes packets based on these labels is called a label-switched router (LSR). According to RFC 3031, when an LSR receives a packet, it uses the label at the top of the stack in the packet header as an index to an Incoming Label Map (ILM). The ILM maps each incoming label to a set of one or more entries in a Next Hop Label Forwarding Entry (NHLFE) table. Alternatively, when packets arrive at the LSR unlabeled, a "FEC-to-NHLFE" function (FTN) maps each "Forwarding Equivalence Class" (FEC) to a set of one or more NHLFE table entries. In either case, each NHLFE indicates the next hop for the packet and an operation to be performed on the label stack. These operations may include replacing the label at the top of the stack with a new label, popping the label stack, and/or pushing one or more new labels onto the stack. After performing the required label stack operations, the LSR forwards the packet through the egress interface indicated by the NHLFE.

It is common practice to map a label in the ILM to a set of multiple NHLFEs for purposes of load balancing. In this context, equal-cost multi-path (ECMP) routing is commonly used as a routing strategy, in which next-hop packet forwarding to a single destination can occur over multiple "best paths," which tie for top place in routing metric calculations. ECMP routing decisions are typically made per hop, by each router along the route of the packet through a network.

To improve load balancing in MPLS networks, Kompella et al. introduced the concept of "entropy labels," in IETF RFC 6790, entitled "The Use of Entropy Labels in MPLS Forwarding" (2012), which is incorporated herein by reference. The authors point out that it is important when load balancing to ensure that packets belonging to a given "flow" are mapped to the same path, i.e., to the same sequence of links across the network. The entropy label, which is incorporated into the MPLS label stack that is pushed onto packets, serves as a key that can be used by transit LSRs in identifying flows for purposes of load balancing.

SUMMARY

Embodiments of the present invention that are described hereinbelow provide enhanced methods and apparatus for label-based routing and forwarding.

There is therefore provided, in accordance with an embodiment of the invention, a method for communication, which includes configuring a router to forward data packets over a network in accordance with Multiprotocol Label Switching (MPLS) labels appended to the data packets. At least first and second entries, corresponding to respective first and second labels, are stored in a Next Hop Label Forwarding Entry (NHLFE) table in the router, such that each of the first entries contains a respective pointer to at least one of the second entries. Upon receiving in the router a data packet from the network, a first entry from among the first entries in the NHLFE table and, responsively to the pointer in the first entry, a second entry is selected from the NHLFE table. The respective first and second labels from the selected first and second entries are pushed onto an MPLS label stack of the data packet, and the data packet is forwarded to the network with the first and second labels in the MPLS label stack of the data packet.

In some embodiments, the respective pointer in at least one of the first entries points to a group of the second entries, and selecting the second entry includes selecting one of the second entries from the group. In one embodiment, the group of the second entries contains at least two entries that include the same label. Additionally or alternatively, the second entry is chosen in accordance with a load-balancing criterion. Further additionally or alternatively, the at least one of the first entries includes a plurality of the first entries, such that the respective pointer in all of the plurality points to the group of the second entries.

In some embodiments, one or more third entries are stored in the NHLFE table, wherein one or more of the second entries contain respective pointers to at least one of the third entries, and the method includes selecting, responsively to the respective pointer in the selected second entry, a third entry from the NHLFE table, and pushing a third label corresponding to the selected third entry onto the MPLS label stack of the data packet together with the first and second labels.

In a disclosed embodiment, storing at least the first and second entries includes setting a reserved label flag in at least one of the entries, and the method includes pushing, responsively to the reserved label flag, at least a third label onto the MPLS label stack of the data packet together with the first and second labels. In one embodiment, pushing the third label includes pushing an entropy label indicated by the reserved label flag onto the MPLS label stack of the packet.

There is also provided, in accordance with an embodiment of the invention, packet routing apparatus, which includes multiple interfaces connected to a network and switching logic configured to transfer data packets among the interfaces. Packet processing logic is configured to cause the switching logic to forward the data packets in accordance with Multiprotocol Label Switching (MPLS) labels appended to the data packets and includes a Next Hop Label Forwarding Entry (NHLFE) table, which is configured to store at least first and second entries, corresponding to respective first and second labels, such that each of the first entries contains a respective pointer to at least one of the second entries. The packet processing logic is configured to select, upon receiving a data packet from the network, a first entry from among the first entries in the NHLFE table and, responsively to the pointer in the first entry, to select a second entry from the NHLFE table, and to push the respective first and second labels from the selected first and second entries onto an MPLS label stack of the data packet before forwarding the data packet to the network.

The present invention will be more fully understood from the following detailed description of the embodiments thereof, taken together with the drawings in which:

DETAILED DESCRIPTION OF EMBODIMENTS

Figure 1:
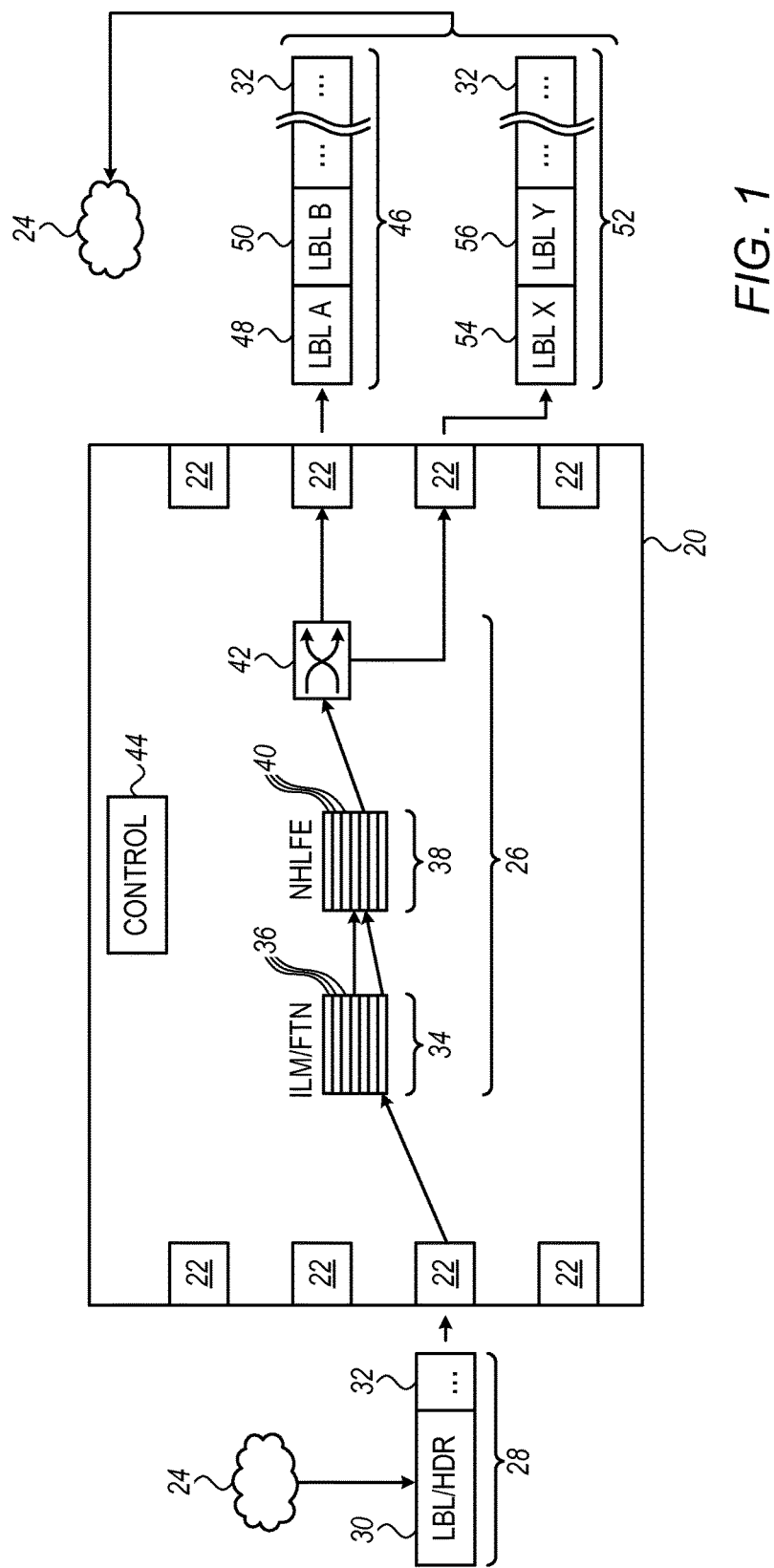
FIG. 1 is a block diagram that schematically illustrates a label-switched router, in accordance with an embodiment of the present invention.

Multi-path and multi-level scenarios are becoming increasingly common in large-scale MPLS networks. As explained above, RFC 3031 provides that each ILM or FTN record in an LSR may point to multiple entries in the NHLFE table, corresponding to multiple paths that a given packet may take. Furthermore, in many situations, a sequence of multiple labels is pushed onto a packet in an LSR (for example by the ingress router to an MPLS network), providing multiple levels of routing information, and not just a single label. For effective load balancing, it can be desirable that the sequences of labels be shuffled, i.e., each packet receives one label from a first group, and another label from a second group, and so forth, with the choice of label in each group varying from packet to packet. Thus, if each group i contains $n_i$ labels, and j labels are to be pushed in sequence onto each packet, then the number of possible different sequences is the product $N=\Pi_{i=1}^{j} n_i$. To support this many label sequence choices in a conventional MPLS router, the NHLFE table would have to contain at least N entries, each entry containing multiple labels. In a large network, tables of this size can become impractical.

Some embodiments of the present invention that are described herein address this problem by configuring the NHLFE table as a linked list. Specifically, the NHLFE table contains at least first and second groups of entries, wherein each of the entries in the first group contains a respective pointer to at least one of the entries in the second group. When a router containing such an NHLFE table receives a data packet from the network, it selects a first entry from the first group (typically based on mapping provided by the ILM or FTN), and then follows the pointer in the first entry to select the next entry from the second group. The entries in the second set may contain pointers to a third group of entries in the NHLFE, and so forth. The router reads the labels from the linked list of entries that it has selected and pushes them onto the MPLS label stack of the data packet before forwarding the data packet to the network.

In some cases, one or both of the first and second groups, as defined above, may contain only a single entry. In the more general case, however, each of the groups (and possibly a third and subsequent groups) may contain a large number of entries, and all of the entries in a given group may contain pointers to any or all of the entries in the next group. Even so, the size of the table will scale as the sum of the numbers of labels in all the groups, rather than the product as in the scenario described above. In other words, configuring the NHLFE table as a linked list can significantly reduce the table size and thus enhance scalability of the network. Appropriate decision logic, such as ECMP calculations, may be applied in choosing the next entry at each stage in the linked list in order to provide load balancing and/or satisfy other relevant packet routing criteria.

The techniques described herein may be applied not only to labels that are used in packet forwarding, but also to push certain "reserved labels," such as entropy labels, onto the packets forwarded by the router. Furthermore, to reduce the size of the NHLFE table still further, some or all of the entries in the NHLFE table may contain a flag, comprising one or more bits, which map to the available reserved labels. Depending on the setting of the flag, a single entry in the NHLFE table may cause the router to push onto the current packet not only the label whose label ID is indicated by the entry, but also a reserved label indicated by the flag.

FIG. 1 is a block diagram that schematically illustrates a label-switched router 20, in accordance with an embodiment of the present invention. For the sake of simplicity and clarity of illustration, FIG. 1 shows only the elements of router 50 that are directly relevant to an understanding of the present embodiments. Integration of these elements with the remaining components required for router operation will be apparent to those skilled in the art. Other aspects and optional features of router 20, as well as possible deployments of the router in a network, are described in U.S. patent application Ser. No. 14/634,842, filed Mar. 1, 2015, which is assigned to the assignee of the present patent application and whose disclosure is incorporated herein by reference.

Router 20 comprises multiple interfaces 22 connected to a network 24. The router is generally capable of forwarding data packets from any ingress interface to any egress interface via switching logic 42, comprising a crossbar switch, for example. The switching and forwarding functions of router 20 are controlled by packet processing logic 26, which comprises an ILM and/or FTN 34, an NHLFE table 38, and control logic 44, and which causes router 20 to forward data packets in accordance with MPLS labels that are appended to the packets.

ILM or FTN 34 stores records 36 corresponding to different, respective FECs to which incoming packets 28 may belong. Each packet comprises a prefix 30 followed by a payload 32. Prefix 30 comprises a packet header and, when the packet has been forwarded by an LSR, one or more MPLS labels preceding the header. In the ILM, each record 36 corresponds to a label ID contained in the MPLS label in prefix 30. In the FTN, records 36 are typically keyed by packet header fields, ingress interface numbers, and/or other parameters. In either case, each record 36 contains a pointer to one or a group of entries 40 in NHLFE table 38. The groups of entries 40 in the NHLFE table define multi-path routing groups, from which control logic 44 selects a single entry for each packet that is directed to the group by the pointer in a corresponding record 36. As shown and described hereinbelow with reference to FIG. 2, some of entries 40 contain pointers to other entries in table 38, thus defining a linked list, while other entries indicate respective interfaces 22 through which corresponding packets are to be forwarded on their next hop.

Based on the entries 40 selected from NHLFE table 38, control logic 44 performs operations on the respective label stacks of incoming data packets received from network 24. These operations may include, for example, pushing, popping and replacing labels; but the present embodiments relate specifically to pushing a sequence of labels onto some or all of the forwarded packets, corresponding to the linked list of pointers to and among entries 40. The final entry in the linked list for any given packet indicates the interface 22 through which the packet is to be forwarded (and may contain other information, such as the destination MAC address), and control logic 44 instructs switching logic 42 to forward the packet accordingly.

Control logic 44 may select the sequence of entries 40 for each packet on the basis of load-balancing considerations, using an ECMP algorithm for example, or alternatively, based on any other suitable selection criteria. As a result of this selection, different outgoing packets that are forwarded by router 20, such as packets 46 and 52, have different, respective sequences of labels pushed onto them by control logic 44, possibly even when the packets are directed to the same destination. Thus, packet 46 contains the sequence of labels 48, 50, . . . , while packet 52 contains the sequence of labels 54, 56, . . . .

Figure 2:
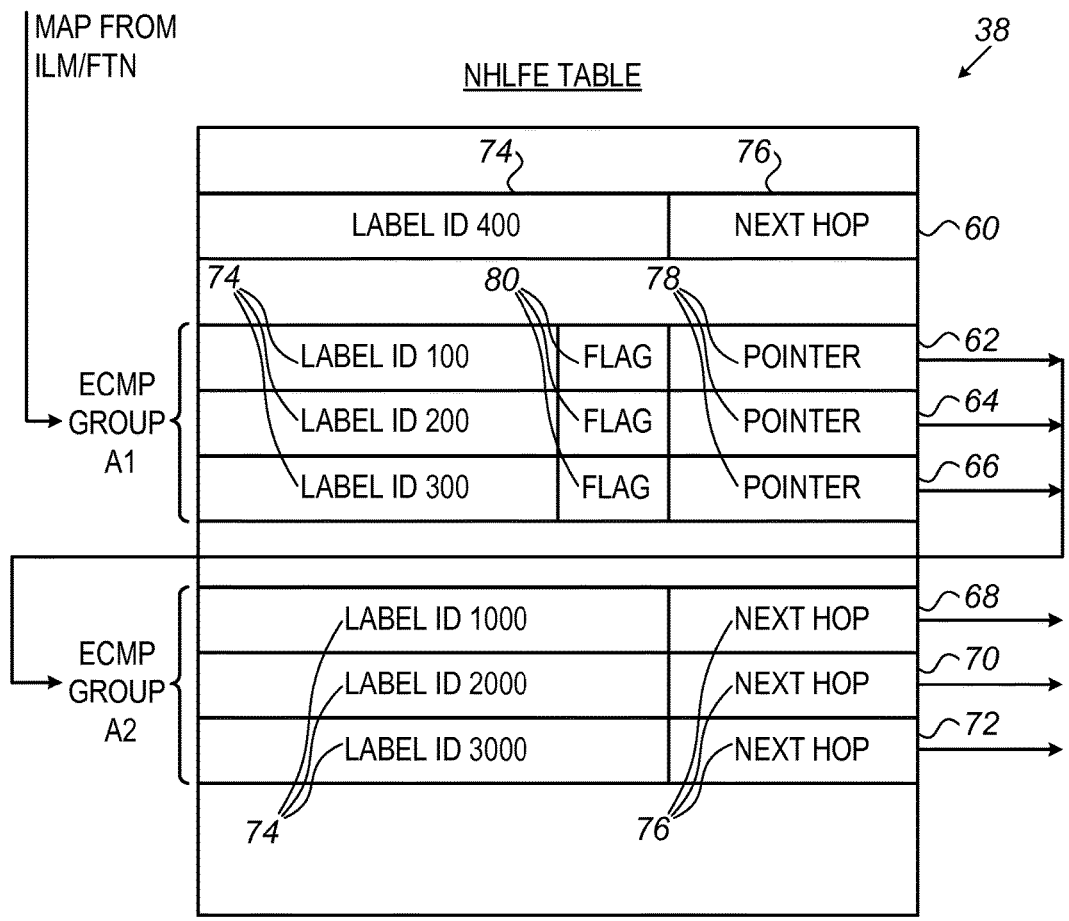
FIG. 2 is a block diagram that schematically illustrates a table used in label-switched routing, in accordance with an embodiment of the present invention.

FIG. 2 is a block diagram that schematically shows details of NHLFE table 38, in accordance with an embodiment of the invention. Each entry 60, 62, 64, 66, 68, 70, 72, . . . , in table 38 in this example (which constitute a subset of the entries 40 in FIG. 1) indicates a label 74 that is to be pushed onto a packet when the particular entry is selected. Conventional entries in table 38, such as entry 60, also contain a next-hop field 76, indicating the interface 22 through which the packet is to be forwarded after pushing the appropriate label onto the packet.

Entries 62, 64 and 66, on the other hand, contain a pointer 78 to one or more other entries in table 38, instead of next hop field 76. In the present example, pointers 78 point to entries 68, 70 and 72. Entries 62, 64 and 66 are arranged as an ECMP group, and are pointed to as a group by one or more of records 36 in ILM or FTN 34. Entries 68, 70 and 72 are arranged as another ECMP group, and may be pointed to not only by pointers 78 in entries 62, 64 and 66, but also by pointers in other entries in table 38 (not shown in the figure). Optionally, in a particular ECMP group, a label and/or interface may appear more than once in order to create a weighted multi-path, i.e., the group may contain multiple entries that comprise the same label.

Control logic 44 follows pointer 78 from entry 62 to entry 68, for example, in order to assemble the sequence of labels <ID=100, ID=1000>, which logic 44 then pushes onto the outgoing packet. Control logic 44 then instructs switching logic 42 to forward the packet through the interface 22 that is indicated by next hop field 76 in entry 68. Although for the sake of simplicity, FIG. 2 illustrates only linked lists containing two entries, which thus generate sequences of only two labels, in alternative embodiments (not shown in the figures), NHLFE table 38 may contain linked lists of three or more entries in order to generate longer label sequences.

In the pictured example, entries 62, 64 and 66 also contain flags 80 that indicate one or more further labels that are to be pushed onto the packets processed by logic 44, in addition to the respective label 74. Flag 80, which is an optional addition to NHLFE table 38, typically comprises a bit vector, with one bit corresponding to each of a set of predefined label values. When the bit is set, logic 44 will read the corresponding value and will add it into the sequence of labels that it pushes onto each packet to which the current NHLFE table entry 62, 64 or 66 applies. Typically (although not necessarily), the label values indicated by flag 80 correspond to reserved labels, which are used for control functions, such as the sort of entropy labels that are described in the above-mentioned RFC 6790. Incorporating flag 80 in entries 62, 64 and 66 eliminates the need to add further entries to NHLFE table 38 containing the corresponding label values and thus reduces the size of the table still farther. The use of flag 80 saves an entry in table 38 for each list of labels, since the reserved label would otherwise have to be duplicated for each list.

The figures and description above present certain particular configurations of logic 26 in router 20, and particularly of NHLFE table 38, that can be used in implementing features of the present invention. This specific implementation is shown solely by way of example, however, and other implementations will be apparent to those skilled in the art after reading the present disclosure. All such implementations are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
configuring a router to forward data packets over a network in accordance with Multiprotocol Label Switching (MPLS) labels appended to the data packets;
storing a Next Hop Label Forwarding Entry (NHLFE) table in the router, the NHLFE table including a plurality of first entries including respective MPLS labels and second entries including respective MPLS labels, such that each of the first entries contains a respective pointer to at least one of the second entries, wherein the respective pointer in at least one of the first entries points to a group including a plurality of the second entries, and wherein each of the second entries in the plurality contains a respective MPLS label;
upon receiving in the router a data packet from the network, selecting, for the received packet, a first entry from among the first entries in the NHLFE table;
responsively to the pointer in the selected first entry, selecting, for the received packet, a second entry from the NHLFE table from the group of the plurality of the second entries;
pushing the respective first and second MPLS labels from the selected first and second entries onto an MPLS label stack of the data packet; and
forwarding the data packet to the network with the first and second MPLS labels in the MPLS label stack of the data packet.

2. The method according to claim 1, wherein the group of the second entries pointed to by the respective pointer in at least one of the first entries contains at least two entries that comprise the same MPLS label.

3. The method according to claim 1, wherein selecting the second entry comprises choosing the second entry in accordance with a load-balancing criterion.

4. The method according to claim 1, wherein the pointers of a plurality of the first entries point to a same group of the second entries.

5. The method according to claim 1, wherein the NHLFE table comprises one or more third entries, wherein one or more of the second entries contain respective pointers to at least one of the third entries, and
wherein the method comprises selecting, responsively to the respective pointer in the selected second entry, a third entry from the NHLFE table, and pushing a third MPLS label corresponding to the selected third entry onto the MPLS label stack of the data packet together with the first and second MPLS labels.

6. The method according to claim 1, wherein the NHLFE table includes a reserved label flag in at least one of the entries, and
wherein the method comprises pushing, responsively to identifying the reserved label flag in the selected first entry or in the selected second entry, at least a third MPLS label onto the MPLS label stack of the data packet together with the first and second MPLS labels.

7. The method according to claim 6, wherein pushing the third MPLS label comprises pushing an entropy label indicated by the reserved label flag onto the MPLS label stack of the packet.

8. The method according to claim 1, wherein each of the second entries includes a next-hop field which indicates an interface of the router.

9. The method according to claim 1, wherein each of the second entries includes a single respective second label, and wherein the group of the second entries contains at least two entries that comprise the same single second MPLS label.

10. The method according to claim 1, wherein selecting the first entry comprises selecting a group of a plurality of first entries based on a header of the data packet and selecting a single entry from the group of the plurality of first entries on the basis of load-balancing considerations.

11. Packet routing apparatus, comprising:
multiple interfaces connected to a network;
switching logic configured to transfer data packets among the interfaces; and
packet processing logic, which is configured to cause the switching logic to forward the data packets in accordance with Multiprotocol Label Switching (MPLS) labels appended to the data packets and comprises a Next Hop Label Forwarding Entry (NHLFE) table, which includes a plurality of first entries including respective MPLS labels and second entries including respective MPLS labels, such that each of the first entries contains a respective pointer to at least one of the second entries, wherein the respective pointer in at least one of the first entries points to a group including a plurality of the second entries, and wherein each of the second entries in the plurality contains a respective MPLS label,
wherein the packet processing logic is configured to select, upon receiving a data packet from the network, a first entry, for the received packet, from among the first entries in the NHLFE table and, responsively to the pointer in the selected first entry, to select, for the received packet, a second entry from the NHLFE table from the group of the plurality of the second entries, and to push the respective first and second MPLS labels from the selected first and second entries onto an MPLS label stack of the data packet before forwarding the data packet to the network.

12. The apparatus according to claim 11, wherein the group of the second entries contains at least two entries that comprise the same MPLS label.

13. The apparatus according to claim 11, wherein the packet processing logic is configured to select the second entry in accordance with a load-balancing criterion.

14. The apparatus according to claim 11, wherein the pointers of a plurality of the first entries point to a same group of the second entries.

15. The apparatus according to claim 11, wherein the NHLFE table includes one or more third entries, wherein one or more of the second entries contain respective pointers to at least one of the third entries, and
wherein the packet processing logic is configured to select, responsively to the respective pointer in the selected second entry, a third entry from the NHLFE table, and to push a third MPLS label corresponding to the selected third entry onto the MPLS label stack of the data packet together with the first and second MPLS labels.

16. The apparatus according to claim 11, wherein at least one of the selected first and second entries in the NHLFE table comprises a reserved label flag, and wherein the packet processing logic is configured to push, responsively to the reserved label flag, at least a third MPLS label onto the MPLS label stack of the data packet together with the first and second labels.

17. The apparatus according to claim 16, wherein the third MPLS label comprises an entropy label indicated by the reserved label flag.

* * * * *